(12) United States Patent
Hirota et al.

(10) Patent No.: US 12,195,169 B2
(45) Date of Patent: Jan. 14, 2025

(54) RAISED STRUCTURE AND WING

(71) Applicants: TOHOKU UNIVERSITY, Miyagi (JP); JAPAN AEROSPACE EXPLORATION AGENCY, Tokyo (JP); MITSUBISHI HEAVY INDUSTRIES, LTD., Tokyo (JP)

(72) Inventors: Makoto Hirota, Sendai (JP); Yuji Hattori, Sendai (JP); Yuki Ide, Chofu (JP); Hikaru Takami, Tokyo (JP); Minoru Yoshimoto, Tokyo (JP)

(73) Assignees: TOHOKU UNIVERSITY, Miyagi (JP); JAPAN AEROSPACE EXPLORATION AGENCY, Tokyo (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 251 days.

(21) Appl. No.: 17/599,092

(22) PCT Filed: Mar. 18, 2020

(86) PCT No.: PCT/JP2020/011911
§ 371 (c)(1),
(2) Date: Sep. 28, 2021

(87) PCT Pub. No.: WO2020/203284
PCT Pub. Date: Oct. 8, 2020

(65) Prior Publication Data
US 2022/0161923 A1 May 26, 2022

(30) Foreign Application Priority Data
Mar. 29, 2019 (JP) .................. 2019-069153

(51) Int. Cl.
*B64C 21/10* (2006.01)
*F15D 1/12* (2006.01)

(52) U.S. Cl.
CPC .............. *B64C 21/10* (2013.01); *F15D 1/12* (2013.01)

(58) Field of Classification Search
CPC .................. F15D 1/12; B64C 21/00
See application file for complete search history.

(56) References Cited

U.S. PATENT DOCUMENTS

| 3,129,908 A * | 4/1964 | Harper ................. B64C 3/46 244/219 |
| 6,345,791 B1 * | 2/2002 | McClure ............... B64C 21/10 244/130 |
| 2015/0217851 A1 * | 8/2015 | Kelso .................. F01D 5/146 244/200 |

FOREIGN PATENT DOCUMENTS

| WO | 2009/000703 | 12/2008 | |
| WO | WO-2009000703 A1 * | 12/2008 | ............... B63B 1/36 |

(Continued)

OTHER PUBLICATIONS

International Search Report issued Jun. 2, 2020 in International (PCT) Application No. PCT/JP2020/011911 with English translation.

(Continued)

*Primary Examiner* — Tye William Abell
(74) *Attorney, Agent, or Firm* — Wenderoth, Lind & Ponack, L.L.P.

(57) ABSTRACT

A raised structure for reducing frictional drag due to viscosity of a flow toward an object in a direction defining an acute angle with a leading edge of the object. The raised structure includes raised bodies configured to be provided on a surface of the object at the leading edge on a downstream side of a stagnation point of the flow. A height of each raised body changes along a convex curve, and the raised bodies are arranged in an array to define a first uneven shape changing periodically in a first cross section configured to (Continued)

have a constant distance from the stagnation point and be orthogonal to the surface, and a second uneven shape changing in a second cross section configured to be orthogonal to a line composed of the stagnation point and the first cross section, the second uneven shape having concave and convex portions that change periodically.

8 Claims, 10 Drawing Sheets

(56) References Cited

FOREIGN PATENT DOCUMENTS

| | | |
|---|---|---|
| WO | 2012/082667 | 6/2012 |
| WO | 2014/026246 | 2/2014 |
| WO | 2018/165313 | 9/2018 |

OTHER PUBLICATIONS

William S. Saric et al., "Leading-Edge Roughness as a Transition Control Mechanism", American Institute of Aeronautics and Astronautics Paper, 1998, pp. 1-13.

Makoto Hirota et al., "Numerical Validation of Suppression Effect of Discrete Roughness Elements on Crossflow Instability", Proceedings of Computational Fluid Dynamics Symposium CFD 2018 32nd with Abstract.

* cited by examiner

RAISED STRUCTURE AND WING

CROSS-REFERENCE TO RELATED APPLICATION

The present application claims priority based on Japanese Patent Application No. 2019-069153 filed Mar. 29, 2019, and the contents thereof are hereby incorporated by reference.

TECHNICAL FIELD

The present invention relates to a raised structure and a wing configured to reduce the viscous frictional drag.

BACKGROUND ART

An object disposed in a flow of viscous fluid receives the viscous frictional drag. For example, an aircraft receives the frictional drag due to air viscosity during the flight. About half of the total drag received by the aircraft during the flight is said to be frictional drag. As the frictional drag is reduced, it is possible to extend the cruising distance for the aircraft, reduce the fuel consumption, and the like, and therefore, various means for reducing the viscous frictional drag have been proposed.

For example, solutions of providing a plurality of projections on a wing are proposed in Patent Documents 1 and 2.

According to the technology described in Patent Document 1, a seamless film is provided on the surface of a wing, wherein the seamless film extends long in a chord direction, and peak valleys being substantially parallel to each other are repeated in a spanwise orthogonal to the chord direction. A cross-sectional shape in the spanwise of the projection portion of the seamless film tapers away from the surface of the wing, and a sharp apex portion is formed at a tip end of the projection portion.

According to the technology described in Patent Document 2, an aerodynamic device having a central projection extending in the chord direction and two outer projections disposed substantially parallel to the central protrusion to sandwich the central protrusion in the spanwise is densely or dispersed on the surface of the wing. A recess portion between the central projection and the outer projection is formed from an inclined surface which gradually separates from the surface of the wing from the tip end side toward the rear end side in the chord direction. A cross-sectional shape of the aerodynamic device in the spanwise is a substantially triangular shape having an apex portion at the tip end side.

The technologies described in Patent Documents 1 and 2 are considered to be technologies for reducing the friction by forming a stable turbulent boundary layer on the surface of the wing by projections. However, it is impossible for the technologies described in Patent Documents 1 and 2 to reduce the frictional drag due to the turbulence transition induced by the crossflow instability in a sweepback wing that are widely used in the aircraft.

In Non-Patent Document 1, it is reported that when a minute discrete roughness (Discrete Roughness Element) is provided in the vicinity of a stagnation point (attachment line) in a wing, the crossflow instability can be suppressed from the results of the wind tunnel experiment. Each discrete roughness element has a substantially columnar shape. According to the technology described in Non-Patent Document 1, it is possible to reduce the friction by properly setting the arrangement interval of the discrete roughness elements so as to shift the location of the turbulence transition induced by the crossflow instability downstream.

In Non-Patent Document 2, the effect of the discrete roughness element in Non-Patent Document 1 is analyzed (evaluated) by numerical analysis. Furthermore, in Non-Patent Document 2, an improved shape of the discrete roughness element is proposed on the basis of a consideration with respect to the analysis result, and a numerical verification result is shown therein.

The shape of the improved discrete roughness element in the Non-Patent Document 2 has a sine curve in the cross section of the spanwise, and has a Gaussian distribution in the cross section of the chord direction, so that it is referred to as the Sinusoidal Roughness Element (SRE, Sinusoidal roughness).

CITATION LIST

Patent Documents

Patent Document 1: International Publication No. 2012/082667
Patent Document 2: International Publication No. 2018/165313

Non-Patent Documents

Non-Patent Document 1: William S. Saric, and two others, "American Institute of Aeronautics and Astronautics Paper, No. 1998-0781" (U.S.), 1998, pp. 1-13
Non-Patent Document 2: Hirota, Ide, Hayashida, and Hattori, "Numerical validation of suppression effect of discrete roughness elements on crossflow instability", "Computational Fluid Dynamics Symposium Lectures Collection CFD 2018, 32" DVD-ROM, The Japan Society of Fluid Mechanics, 2018

SUMMARY OF INVENTION

Technical Problem

However, the above-described prior art has the following problems.

As described above, according to the technologies described in Patent Documents 1 and 2, it is impossible to suppress the turbulence transition due to the crossflow instability generated in the sweepback wing, so that the frictional drag in the sweepback wing cannot be reduced much. In particular, according to the configurations disclosed in Patent Documents 1 and 2, the projections extend long in the chord direction such that the frictional drag is increased as a result of promoting the turbulence transition of the crossflow.

According to the analysis disclosed in Non-Patent Document 2, a low wavenumber of the disturbance tends to increase the amplitude of the disturbance, and it is easy to reach the saturation state so as to transition to the turbulent flow. On the other hand, there is a feature that when the wavenumber of the disturbance is high, the amplitude at the saturation state is low and even the saturation state is once reached, it is impossible to transition to the turbulent flow immediately. Adjusting the size, the arrangement pitch, or the like of the discrete roughness elements leads to suppressing the growth of the lower wavenumber disturbances by selectively exciting disturbances of a particular wavenumber component in the cross flow.

Accordingly, in a case in which the discrete roughness element is provided as described in the Non-Patent Document 2, there is a problem that it is necessary to take much care to note that the turbulence transition does not occur due to the "Killer Mode (a crossflow mode in which the growth rate (or N-factor) is relatively low)" having the specific wavenumber that is excited by the discrete roughness element.

Furthermore, according to the analysis disclosed in Non-Patent Document 2, the discrete roughness element disclosed in Non-Patent Document 1 simultaneously excites a plurality of high wavenumber disturbances and the excitation capability of the amplitude of a specific single wavenumber is low, such that there is a problem that the suppression effect of the turbulence transition is low.

Since the improved sine wave roughness element disclosed in Non-Patent Document 2 has a higher excitation capacity of the amplitude of the specific wavenumber, the effect of suppressing the turbulence transition is improved.

However, since turbulence transition occurs immediately when the height of the discrete roughness element exceeds a certain value regardless of the shape, it is preferable to obtain a greater suppression effect in a range not exceeding this certain value in consideration of the stability of controlling the turbulence transition. In this sense, there is still room for further improvement in the shape of the discrete roughness element.

The present invention has been made in view of the above-mentioned circumstances, and an object of the present invention is to provide a raised structure and a wing capable of reducing the frictional drag caused by crossflow instability.

Solution to Problem

In order to solve the above-mentioned problems, a raised structure according to a first aspect of the present invention is the raised structure configured to reduce frictional drag due to viscosity of a main flow toward an object in a direction forming an acute angle with an leading edge of the object, the raised structure comprising a plurality of raised bodies provided on a surface of the leading edge of the object at a downstream side of a stagnation point of the main flow and extending on the surface along a flow direction of the main flow, wherein the height of each of the plurality of raised bodies changes along a smooth convex curve such that the height gradually increases from two end portions toward an intermediate portion and reaches the maximum value at the intermediate portion in either of cross sections along a longitudinal direction and a short direction, and the plurality of raised bodies are arranged in an array to: form a first uneven shape which changes periodically in a first cross section having a constant distance from the stagnation point and being orthogonal to the surface, and form a second uneven shape which changes in a second cross section that is orthogonal to a line composed of the stagnation points and the first cross section, the second uneven shape having concave portions and convex portions that change periodically, and the height of an apex of each convex portion changing along a convex envelope.

According to the raised structure of a second aspect of the present invention, in the first aspect, the first uneven shape may be a sinusoidal shape having a constant wavenumber, and the envelope may be a bell-shaped curve.

According to the raised structure of a third aspect of the present invention, in the first or the second aspect, the maximum height of each of the plurality of raised bodies may be equal to or more than 1.7 times and equal to or less than 2.3 times a boundary layer displacement height formed by the main flow.

A wing according to a fourth aspect of the present invention includes the raised structure according to any of the first aspect to the third aspect on a surface thereof.

Advantageous Effects of Invention

According to a raised structure of any of the first aspect to the third aspect and a wing of the fourth aspect of the present invention, the frictional drag caused by the crossflow instability can be reduced.

DESCRIPTION OF EMBODIMENTS

A raised structures and a wing according to an embodiment of the present invention will be described with reference to the accompanying drawings.

Figure 1:
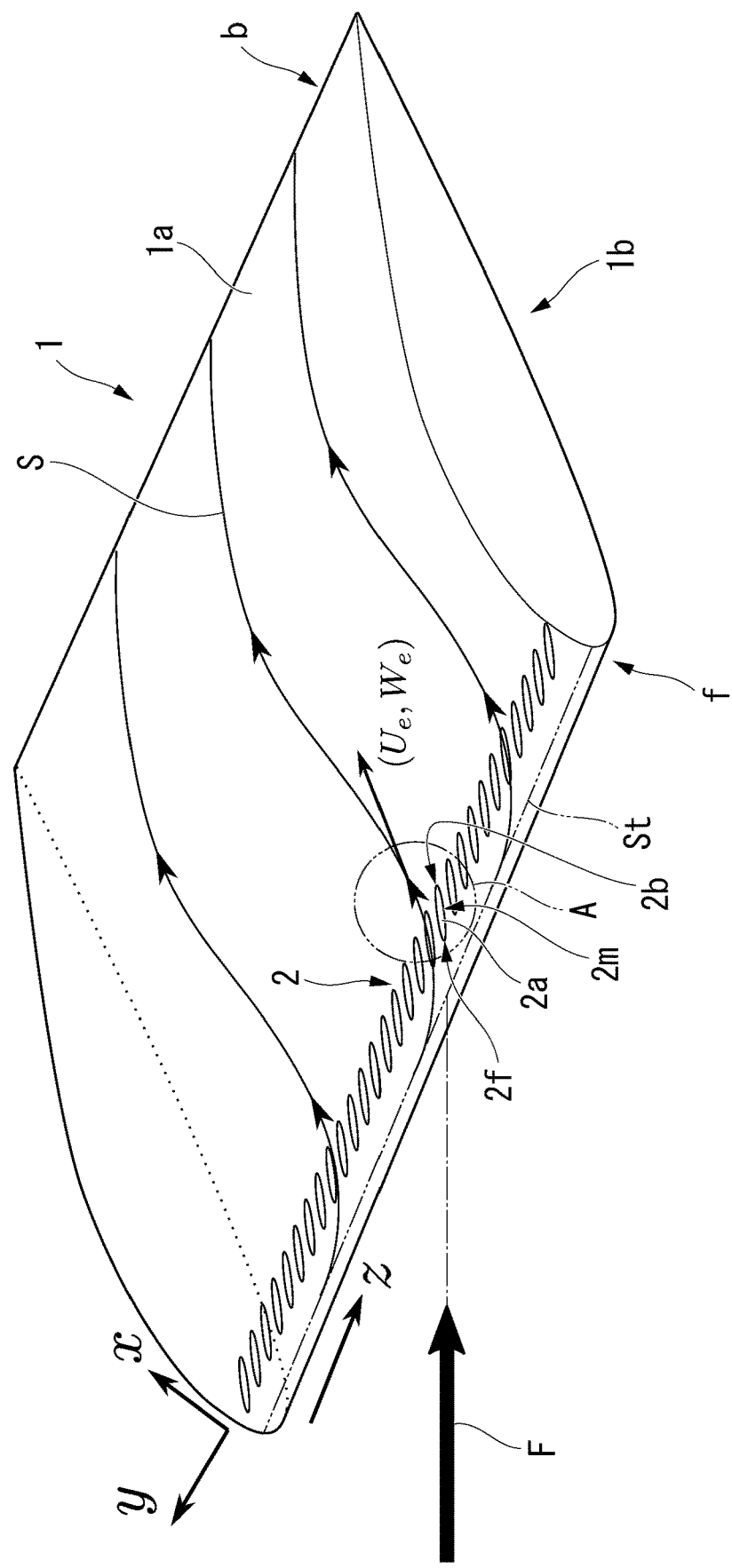
FIG. 1 is a schematic perspective view showing an example of a raised structure and a wing according to an embodiment of the present invention.

FIG. 1 is a schematic perspective view showing an example of a raised structure and a wing according to the embodiment of the present invention A wing 1 (object) according to the present embodiment shown in FIG. 1 is used, for example, as a sweepback wing of an aircraft. However, FIG. 1 only shows a portion of the wing 1 in a spanwise.

The wing 1 has a suitable airfoil shape that gradually decreases after the wing thickness increases to the maximum value from the leading edge f to the trailing edge b. The specific airfoil profile is not particularly limited. In the example shown in FIG. 1, the airfoil profile has a bulge of an upper surface 1a (surface) larger than a bulge of the lower surface 1b with respect to the chord line connecting the leading edge f and the trailing edge b.

For example, the wing 1 is attached to a fuselage (not shown) at an appropriate mounting angle in which the leading edge f is higher than the trailing edge b. In a plan view, the reference line of the wing is inclined in an oblique rear direction with respect to a longitudinal axis of the fuselage. Accordingly, in the plan view, the leading edge f is also inclined in the oblique rear direction with respect to the longitudinal axis of the fuselage.

In FIG. 1, a flow F represents an air flow received by the wing 1 when the aircraft to which the wing 1 is attached advances straight.

At the flight time of the aircraft, a stagnation point St (see two-dot chain line) of the flow F is formed at a fixed location at the tip end portion of the wing 1 (the end portion of the object). The stagnation point St extends linearly along the leading edge f at the tip end portion of the wing 1

A raised structure 2 according to the present embodiment is formed on the upper surface 1a on a downstream side of the stagnation point St at the tip end portion of the wing 1.

The raised structure 2 is provided to reduce the frictional drag due to the viscosity of the flow F (main flow) flowing toward the wing 1. The location of the stagnation point St for determining the arrangement of the raised structure 2 varies depending on the flight situation. In the consideration of designing the raised structure 2, the stagnation point St formed in a flight s in which the frictional drag is desired to be reduced is used. For example, a stagnation point St may be used when the aircraft flies horizontally.

The raised structure 2 includes a plurality of unit ridges 2a (raised bodies).

Each unit ridge 2a extends along the flow direction of the flow F on the upper surface 1a (see the flow line S schematically shown in FIG. 1). The flow line S at an arbitrary location on the upper surface 1a is determined by numerical analysis given the shape of the wing 1 from which the raised structure 2 has been removed, the velocity of the flow F, the viscosity of the flow F, and the like.

The height of each unit ridge 2a is changing along a convex smooth curve which gradually increases from both ends toward the intermediate portion and reaches the maximum at the intermediate portion in any cross-section in the longitudinal direction and the short direction. For example, in the cross section in the longitudinal direction, the height of each unit ridge 2a changes from the tip end 2f on the upstream side and the rear end 2b on the downstream side toward the intermediate portion 2m between the tip end 2f and the rear end 2b along a convex smooth curve which gradually increases and reaches the maximum at the intermediate portion 2m. Here, the intermediate portion 2m may be the center in the longitudinal direction of the unit ridge 2a, or may shift from the center in the longitudinal direction. Although not shown, the configuration in the cross section in the short direction is the same.

In this manner, the tip end surface in the raising direction in the unit ridge 2a is a rounded smooth curved surface. An extension direction of the unit ridge 2a is represented by a ridge line composed of the apex portion in the cross section in the short direction. It is more preferable that the ridge line extends in the flow direction of the flow F. However, since the ridge line of the unit ridge 2a is at a stationary point of the smooth projection in the cross section in the short direction, the ridge line may extend in the substantially flow direction in consideration of a measurement error, a manufacturing error, and the like.

In the example shown in FIG. 1, each unit ridge 2a of the raised structure 2 is arranged at equal intervals on a line with a constant distance from the stagnation point St. As a result, the raised structure 2 forms a first uneven shape that varies periodically in a cross section (first cross section) along the arrangement direction. In the raised structure 2, in a second cross section orthogonal to a line composed of the stagnation point St and the first cross section, a second uneven shape in which the height of the apex of each protrusion changes along a convex envelope is formed.

Specific examples of the raised structure 2 will be described below.

Before describing the specific example of the raised structure 2, a three-dimensional boundary layer and crossflow instability on the wing 1 will be described.

Figure 2:
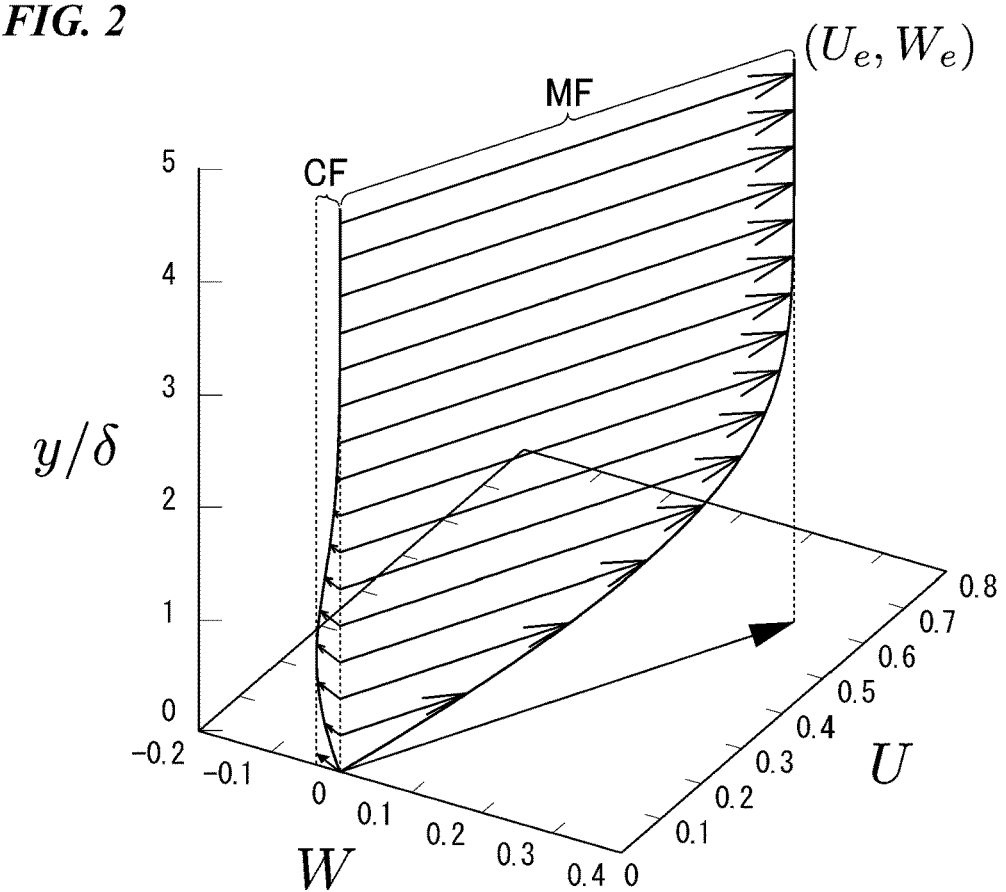
FIG. 2 is a schematic view showing an example of a flow velocity distribution of a three-dimensional boundary layer on the wing.
Figure 3:
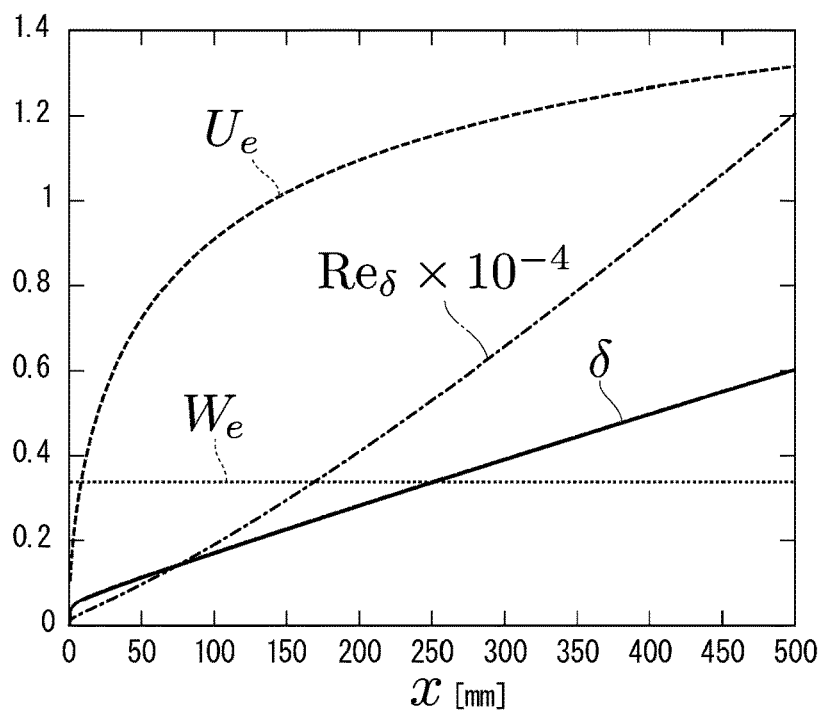
FIG. 3 is a graph showing the relationship between the location x in the chord direction and the boundary layer outer edge velocity $U_e$, $W_e$, the boundary layer displacement thickness $\delta$, and the Reynolds number $Re_\delta$.
Figure 4:
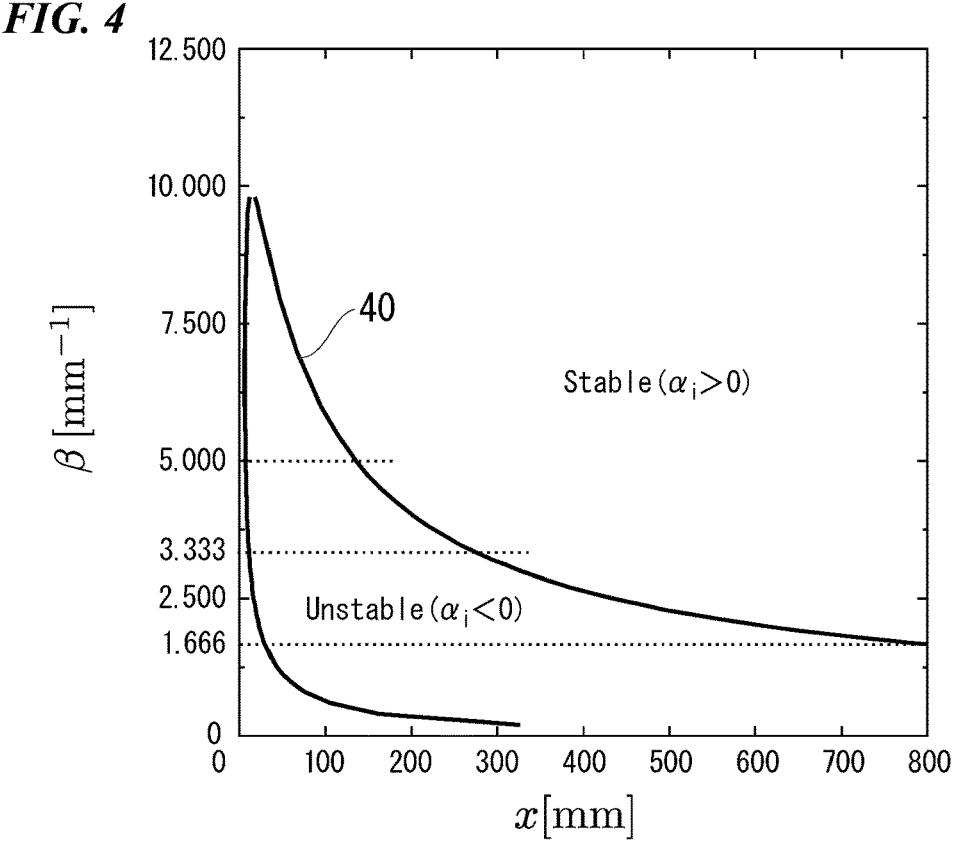
FIG. 4 is a graph showing a neutral stability curve of the crossflow instability.
Figure 5:
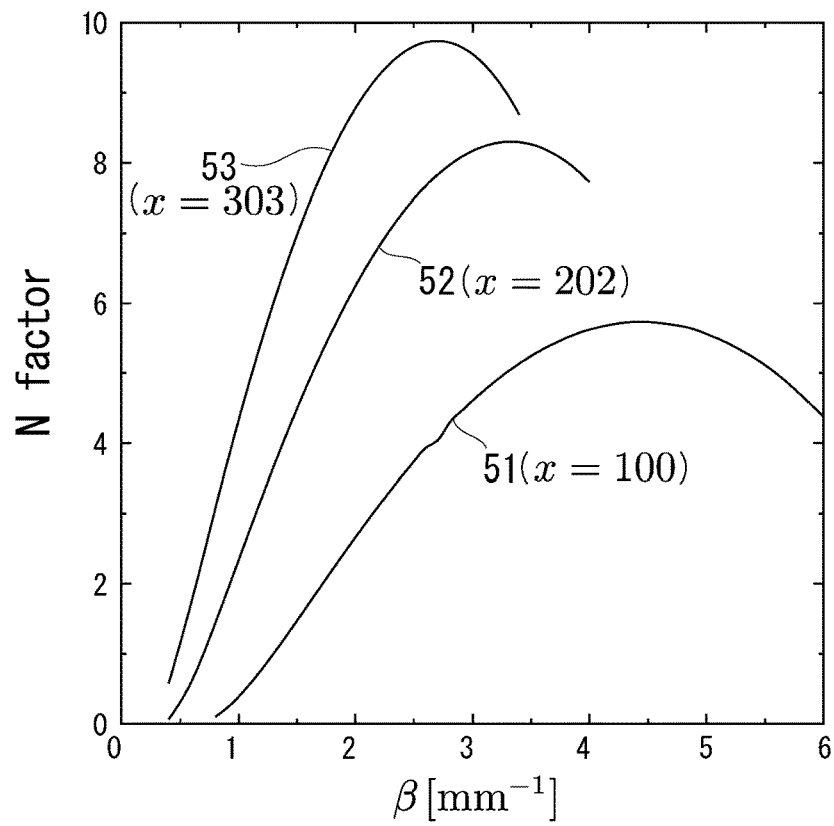
FIG. 5 is a graph showing an N-factor of the crossflow instability.

FIG. 2 is a schematic view showing an example of a flow velocity distribution of a three-dimensional boundary layer on a wing. FIG. 3 is a graph showing the relationship between the location X in the chord direction and the boundary layer outer edge velocity $U_e$, $W_e$, the boundary layer displacement thickness $\delta$, and the Reynolds number $Re_\delta$. In FIG. 3, the horizontal axis X represents the length [mm] advancing in the positive direction in the X direction from the stagnation point St. The longitudinal axis represents the boundary layer outer edge velocity $U_e$, $W_e$, the boundary layer displacement thickness $\delta$, and the Reynolds number $Re_\delta$. However, the boundary layer displacement thickness $\delta$ is represented by a dimensionless value by 1 mm. FIG. 4 is a graph showing a neutral stability curve of the crossflow instability. FIG. 5 is a graph showing the N-factor of the crossflow instability.

As shown in FIG. 1, in the following description, the direction along a straight line composed of the stagnation point St is referred to as the Z direction. The Z direction is also the spanwise of the wing 1. The positive direction in the Z-direction is the direction toward the tip end of the wing 1 in the longitudinal direction from the fuselage (not shown).

The direction orthogonal to the straight line composed of the stagnation point St of the wing 1 and along the upper surface 1a is referred to as the X direction. In particular, if there is no risk of misunderstanding, the X direction may simply be referred to as the chord direction. The positive direction in the X-direction is the direction from the stagnation point St to the rear edge B along the upper surface 1a The direction orthogonal to the Z direction and the X direction is referred to as the Y direction. The Y direction is the raising direction of the unit ridges 2a.

As will be described below, the length and arrangement pitch of the unit ridges 2a of the raised structure 2 are sufficiently short with respect to the width in the chord direction and the length in the spanwise of the wing 1. Accordingly, in the formation range of the raised structure 2, the upper surface 1a can be approximated as a flat surface on analysis.

FIG. 2 shows an example of the flow velocity distribution of the three-dimensional boundary layer formed on the top surface 1a at the tip end portion of the wing 1. In FIG. 2, the U-axis represents the flow velocity in the chord direction, and the W-axis represents the flow velocity in the spanwise. Either flow rate is normalized (nondimensional) by the sound velocity 311 m/s at the stagnation point St (x=0). In FIG. 2, the y/δ axis is the location in the y-direction that is normalized by the boundary layer displacement thickness δ.

Since the flow F is incident obliquely to the stagnation point St in accordance with the sweepback angle of the wing 1, the outer edge speed of the boundary layer of the main flow has the velocity components of $U_e$ and $W_e$ in the chord direction and the spanwise, respectively. Outside the boundary layer, there is no velocity component other than $U_e$ and $W_e$.

On the other hand, inside the boundary layer, since the chord direction as the direction of the pressure gradient and the direction of the main flow are not parallel to each other, a crossflow (CF) is generated in a direction intersecting the flow direction of the main flow (MF). The crossflow velocity distribution is a unimodal distribution in which the velocities at the surface of the upper surface 1a and the outer edge of the boundary layer are zero and the velocity at the intermediate portion thereof reaches the maximum value.

Accordingly, the synthetic flow velocity distribution inside the boundary layer is twisted with respect to a cross section along the flow of the main flow.

The flow F accelerates in the chord direction in correspondence with the shape of the airfoil of the wing 1 as advancing along the upper surface 1A. FIG. 3 shows an analysis example of changes of the boundary layer outer edge velocity $U_e$, $W_e$, boundary layer displacement thickness δ, and Reynolds number $Re_δ$ in the x-direction when there is a crossflow. Here, the Reynolds number $Re_δ$ is defined by the equation $Re_δ = \{\sqrt{(U_e^2 + W_e^2)}\}/\upsilon_0$. However, the parameter $\upsilon_0$ is the dynamic viscosity coefficient of the air (fluid) at the stagnation point St.

A detailed calculation method disclosed in the graph of FIG. 3 is the same as described in Non-Patent Document 2.

The boundary layer outer edge velocity $U_e$ in the chord direction increases sharply as x increases from the stagnation point St (x=0) and gradually increases to be saturated. The boundary layer outer edge velocity $W_e$ in the spanwise is constant regardless of x.

The boundary layer displacement thickness δ increases substantially linearly after it has rapidly increased in an early stage. Accordingly, it is noted that at the more rear end in the chord direction, the thickness of the boundary layer increases more. On the other hand, the Reynolds number $Re_δ$ increases substantially linearly as x increases. Therefore, it is noted that the laminar flow boundary layer tends to cause the turbulence transition on the rear end side of the wing 1.

It is considered that the turbulence transition is excited by deposits on the upper surface 1a, the minute irregularities of the wing surface itself, and the like. By locally approximating the disturbance with a planar wave, a neutral stability curve of the crossflow instability as the curve 40 shown in FIG. 4 is obtained.

That is, taking the stationary mode of the disturbance into consideration, the disturbance is approximated locally by a plane wave ($\propto \exp(i\alpha x + i\beta z)$). Here, the parameter i is the imaginary unit, the parameter α is the chord-direction wavenumber (complex number), and the parameter β is the spanwise wavenumber (real number). If the spanwise wavenumber β is given, the chord-direction wavenumber α is determined as a complex eigenvalue.

In FIG. 4, the horizontal axis is the location x in the chord direction, and the vertical axis is the spanwise wavenumber β in the disturbance that is approximated by the local plane wave.

The curve 40 is a curve in which the complex component $\alpha_i$ of the chord direction wavenumber $\alpha(=\alpha_r + i\alpha_i)$ that is represented by the complex number in the disturbance is zero. Accordingly, the outside of the curve 40 (the region described as "Stable ($\alpha_i > 0$)") is the stable region since $\alpha_i > 0$. On the other hand, the inside of the curve 40 (the region described as "unstable ($\alpha_i < 0$)") is the unstable region since $\alpha_i < 0$.

According to FIG. 4, when the wavenumber β is high, a region far from the leading edge f in the chord direction becomes the stable region; however, the unstable region extends more to the trailing end when the wavenumber β becomes lower, and the unstable region is enlarged.

FIG. 5 shows a graph in which the N-factor (N-factor) with respect to the spanwise wavenumber β ($mm^{-1}$) is plotted. The curves 51, 52, 53 show the N-factors when x=100, 202, and 303 (mm), respectively. The N-factor is determined by setting the amplification factor (gain) of the disturbance as the function $e^N$. The larger the N-factor, the more likely the turbulence transition occurs.

As shown by the curves 51, 52, 53 in FIG. 5, it is noted that the disturbance is amplified by the high wavenumber component as the parameter x becomes smaller, and the disturbance is amplified by the low wavenumber component as the parameter x becomes larger. Furthermore, the magnitude of the amplification factor becomes larger as the low wavenumber component. For example, when x=202 (mm), the mode in which the amplification by β=3.333 ($mm^{-1}$) is the dominant mode, and the N-factor exceeds 8.

Accordingly, if the energy forming the disturbance is distributed to the high wavenumber component, it is considered that the growth of the disturbance of the low wavenumber component can be suppressed without increasing the N-factor. In this case, the amplitude of the disturbances of the high-wavenumber increases. However, it is difficult for the disturbance of the high wavenumber component to cause the turbulence transition even if the disturbance of the high wavenumber component grows than the disturbance of the low wavenumber component such that it is difficult for the turbulence transition occur in the boundary layer as a whole.

In the Non-Patent documents 1 and 2, it is reported that particularly when the discrete roughness element is arranged at an interval where the disturbance of the spanwise wavenumber β is about 1.5 times the spanwise wavenumber β of the disturbance that is desired to be suppressed, the turbulence transition location can be shifted downstream.

The inventor of the present invention considers that if the excitation of the disturbance due to the discrete roughness element can be more efficient, it is possible to suppress more effectively the disturbance that is targeted for suppression, and then reaches the present invention.

Next, a specific example of the raised structure 2 will be described in detail.

Figure 6:
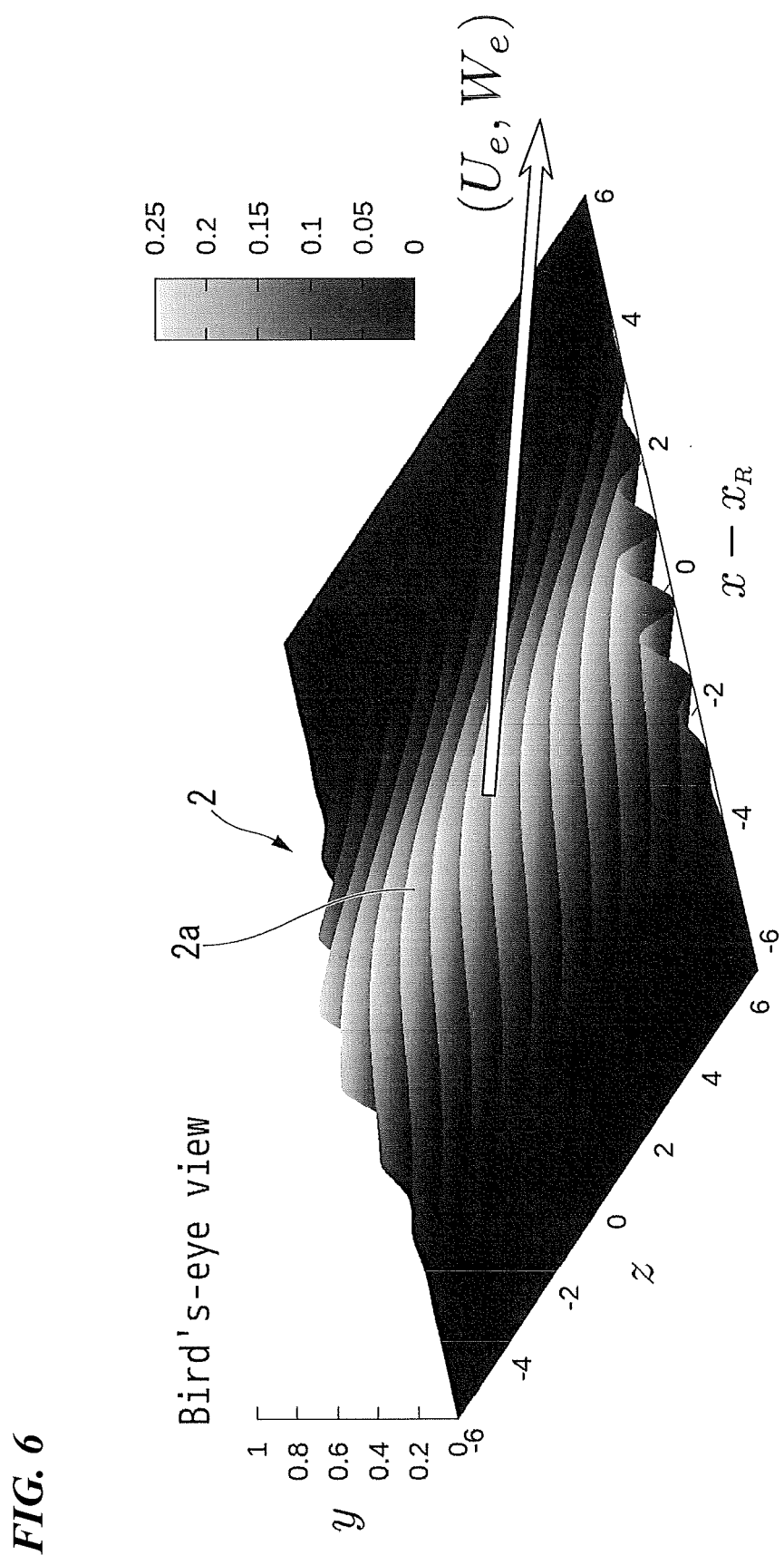
FIG. 6 is a perspective view showing an example of a raised structure according to the embodiment of the present invention.
Figure 7:
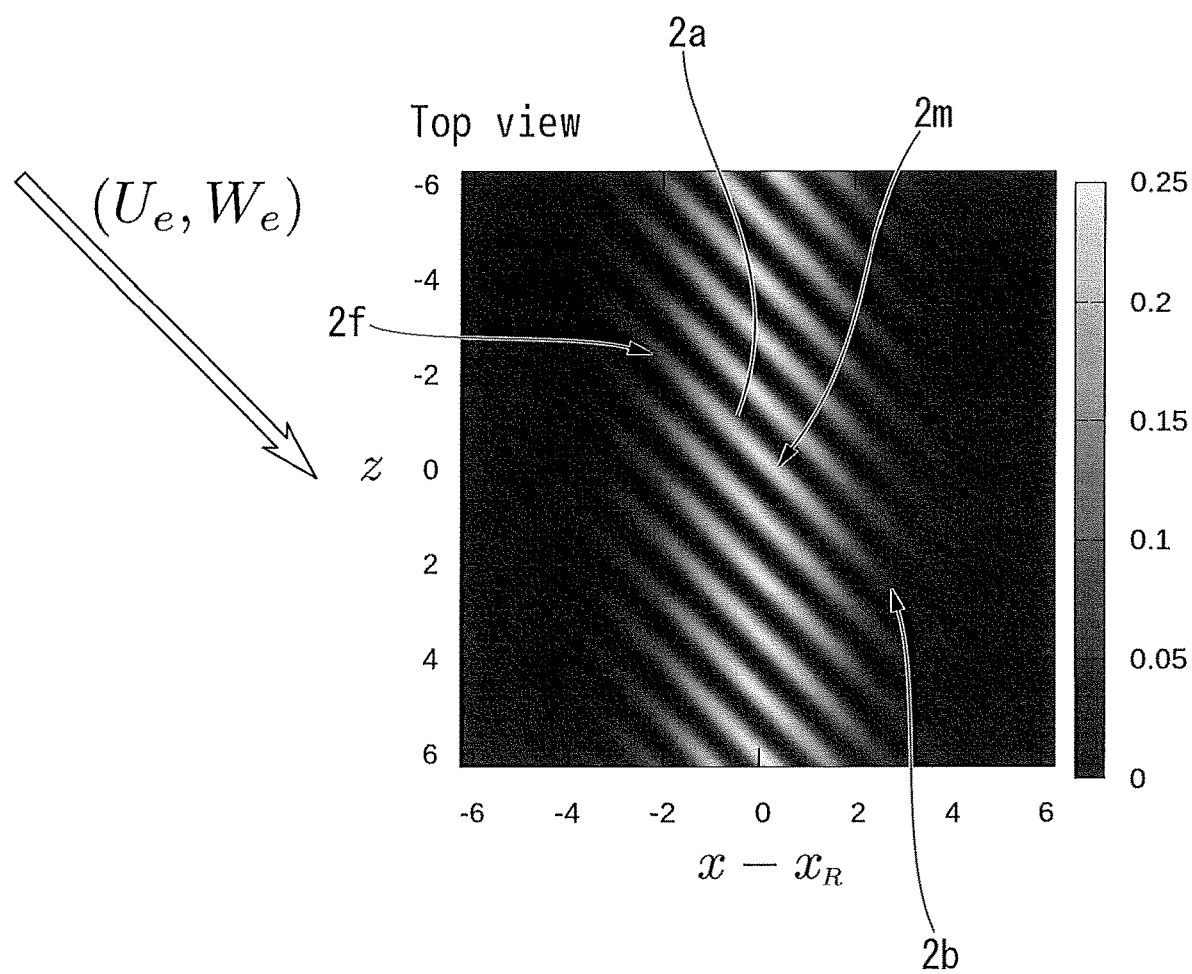
FIG. 7 is a plan view showing an example of a raised structure according to the embodiment of the present invention.
Figure 8:
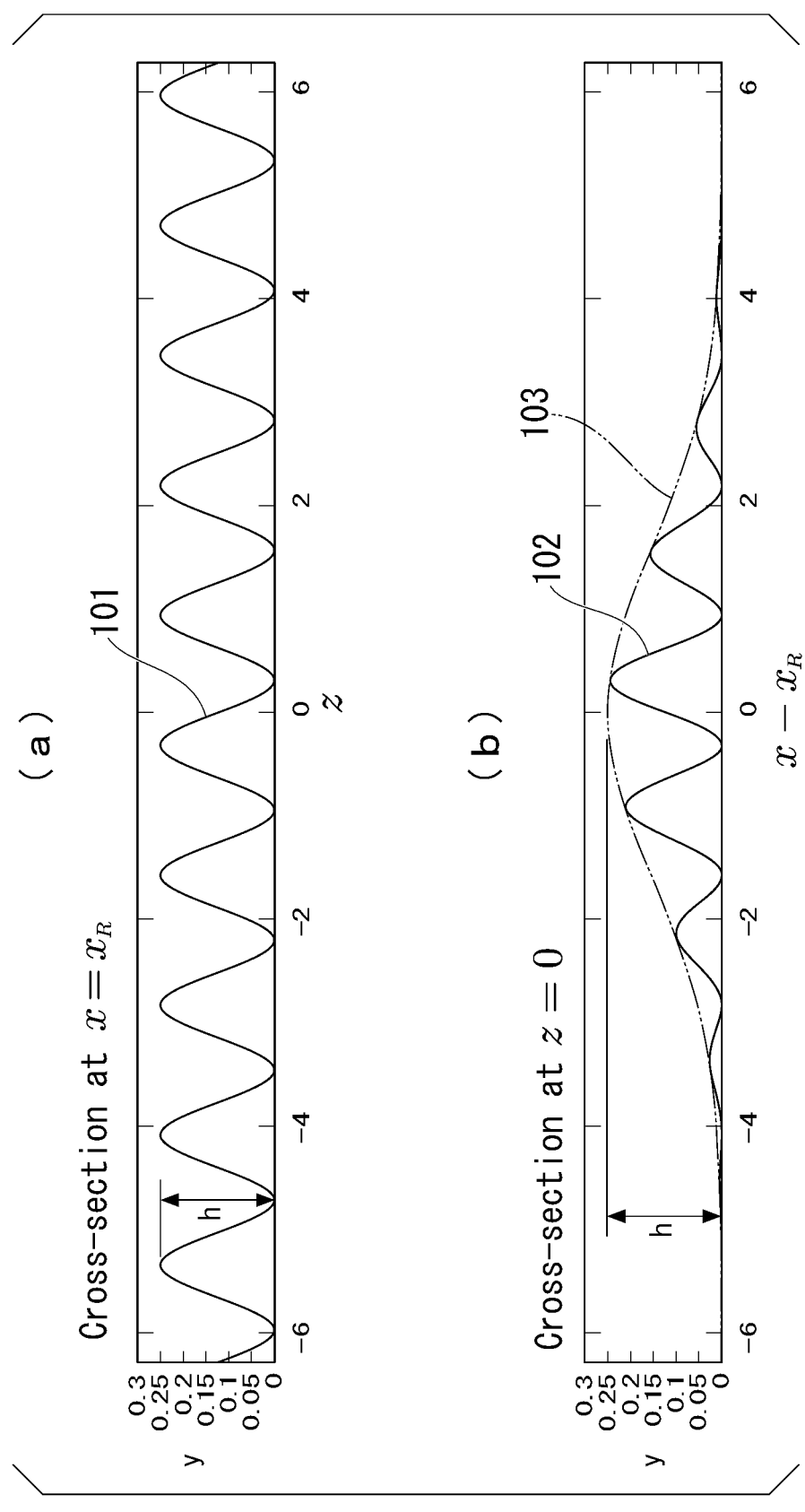
FIG. 8 is a graph showing a cross-sectional shape in a spanwise and a chord direction of an example of a raised structure according to the embodiment of the present invention.

FIG. 6 is a perspective view showing an example of the raised structure according to the embodiment of the present invention. FIG. 7 is a plan view showing the example of the raised structure according to the embodiment of the present invention. The figures (a) and (b) in FIG. 8 are graphs showing the cross-sectional shapes in the spanwise and the chord direction of the example of the raised structure according to the embodiment of the present invention. In FIGS. 6-8, the parameters x, y, and z are processed to be nondimensional parameters at 1 mm.

The shape $y = y_R(x, z)$ of the raised structure 2 shown in FIGS. 6 and 7 is represented by the following equations (1) to (5). However, the definition region of z in equation (1) is appropriately set in the range of the wing length of the wing 1. In this case, it is more preferable that the end portion where the parameter y further smoothly and gradually decreases toward zero is connected to the end edge of the definition region in the z-direction of the raised structure 2.

[Math. 1]

$$y_R(x, z) = h \frac{1 - \sin\beta_R\left(z - \frac{W_e(x_R)}{U_e(x_R)}x\right)}{2} \exp[-\pi(x - x_R)^2/w^2] \quad (1)$$

Here, the parameter h is the maximum height of the raised structure 2, $\beta_R$ is the spanwise wavenumber (the wavelength is $2\pi/\beta_R$), $x_R$ is the location of the raised structure 2 in the chord direction, w is the width of the raised structure 2 in the chord direction. $U_e(X_R)$ and $W_e(X_R)$ are the values of $U_e(X)$ and $W_e(X)$ when $x=x_R$, respectively.

In the equation (1), in the cross section in the chord direction obtained by fixing the location x in the chord direction, that is, in a first cross section where the distance from the stagnation point St is constant and orthogonal to the upper surface 1a, $y_R$ is a function of z only and $y_R$ is a sine wave (first uneven shape) of the wavenumber $\beta_R$.

For example, as shown in the curve 101 in the figure (a) of FIG. 8, when $x=x_R$, $y_R$ is a sine wave vibrating at the wavenumber $\beta_R$ from zero to h. When $x \neq x_R$, similarly $y_R$ is the same sine wave except that the maximum value of y changes to be less than h in accordance with $(x-x_R)$.

In the equation (1), in a cross section in the spanwise obtained by fixing the location z in the spanwise, that is, in a second cross section orthogonal to a line composed of the stagnation point St and the first cross section, $y_R$ is a function of x only, and $y_R$ is a product of a sinewave component of a wavenumber $\{\beta_R(W_e(x_R)/U_e(x_R))\}$ and Gaussian function component with $x_R$ as the center and having a unilateral width w in the chord direction. However, the unilateral width w represents a unilateral width at a height $\exp(-\pi)$ ($=0.0432$).

Accordingly, in the second cross section, $y_R$ forms a second uneven shape having a concave portion and a convex portion (the concave portion and the convex portion of the sinewave) that are changing periodically by the wavenumber $\{\beta_R(W_e(x_R)/U_e(x_R))\}$, and the height of the apex of each convex portion is changing along a convex envelope (Gaussian function).

For example, as shown in the curve 102 in the figure (b) of FIG. 8, when z=0, the amplitude of $y_R$ attenuates along a Gaussian function represented by the curve 103 from the location $x=x_R$ toward both ends in the width direction, and $y_R$ forms the concave portion and the convex portion changing periodically by the wavenumber $\{\beta_R(W_e(x_R)/U_e(x_R))\}$. In the example shown in the figure (b) of FIG. 8, the unilateral width of the Gaussian function is w=4 (mm).

The parameters $\beta_R$, $x_R$, h, and w in the equation (1) are set for the purpose of extending the length of the laminar flow boundary layer on the upper surface 1a by shifting the turbulence transition location in the chord direction to the downstream side.

An example of the setting method for each parameter will be briefly described below. The description of well-known matters and methods of in the cross flow instability analysis for a person skilled in the art will be appropriately omitted.

The disturbance is subjected to Fourier decomposition in the spanwise, and the wavenumber is set to be $\beta$. According to each parameter $\beta$, the spatial growth rate-$\alpha i$ (x, $\beta$) of the stationary crossflow instability can be evaluated as the following equation (2).

[Math. 2]

$$-\alpha_i(x, \beta) = c_1 \frac{U_{\|e}}{U_e \delta}\left[\hat{k}(c_2 - \hat{k}) - \frac{c_3}{\text{Re}_\delta}\right] \quad (2)$$

$$U_{\|e} = \frac{U_e W_e}{\sqrt{U_e^2 + c_4^2 W_e^2}}(1 - c_4) \quad (3)$$

$$\hat{k} = \beta\delta\sqrt{c_4^2 \frac{W_e^2}{U_e^2} + 1} \quad (4)$$

$$\text{Re}_\delta = \frac{U_{\|e}\delta}{v_0} \quad (5)$$

Here, the parameters $C_1$, $C_2$, $C_3$ and $C_4$ are dimensionless constants dependent on the shape of the wing surface, and for example, $C_1=0.45$, $C_2=1.5$, $C_3=15$, $C_4=0.83$. However, the parameters $C_1$, $C_2$, $C_3$, and $C_4$ are set to the values approximately in such an order even if the shape of the wing surface differs.

More specifically, the precise spatial growth rate-$\alpha i$ (x, $\beta$) can be calculated by numerically performing the linear stability analysis of the boundary layer flow.

The amplification factor (gain) of the disturbance can be evaluated by the N-factor (see equation (6) shown below) obtained by integrating the above-mentioned spatial growth rate with x. The N-factor is a function of x and $\beta$.

[Math. 3]

$$N = \exp\int_0^x -\alpha_i(s, \beta)ds \quad (6)$$

Generally, the N-factor becomes larger with the lower wavenumber $\beta$, and it is easy for the turbulence transition to occur.

Even the situation differs depending on the noise level of the environment, it may be assumed, for example, that a disturbance with the N-factor to be equal to or larger than 8 is the environment to cause the turbulence transition. For example, in a case of an aircraft, it is said that the N-factor threshold to cause the turbulence transition is 8-10. Accordingly, for an aircraft, N=8 is a safety estimation.

The wavenumber $\beta_R$ in the raised structure 2 is the wavenumber that excites the disturbance. Accordingly, the wavenumber giving an N-factor smaller than the N-factor selected as the threshold value is selected as the wavenumber $\beta_R$ so as to prevent the turbulence transition being excited by the raised structure 2 from occurring. For example, if the threshold value is N=8, the N-factor used for selecting the wavenumber $\beta_R$ may be, for example, N=6.

In this case, $\beta_R$ is determined by substituting N=6 to the left side of the equation (6).

Next, the location x where the spatial growth rate-$\alpha i$ (x, $\beta_R$) has the maximum value with $\beta=\beta_R$ is set to be the arrangement location $x_R$ of the raised structure 2. The arrangement location of the raised structure 2 represented by the equation (1) is the center of each unit ridge 2a and defined at a location where and the height of the unit ridge 2a is equal to the maximum height h.

The disturbance is more easily excited by the raised structure 2 as the maximum height h of the raised structure 2 is higher such that it becomes easy to suppress the disturbance of the low wavenumber. However, if the maximum height h is too high, the amplitude of the disturbance excited by the raised structure 2 becomes too large. As a result, the turbulence transition may occur immediately. Accordingly, the maximum height h should be equal to or less more than three times the boundary layer displacement thickness $\delta(x_R)$ at the location $x_R$. More preferably, the maximum height h is about twice of $\delta(x_R)$, for example, equal to or more than 1.7 times and equal to or less than 2.3 times as the safety estimation.

For example, in the example shown in the figures (a) and (b) in FIG. 8, when $\delta(x_R)=0.087$ (mm), $h/\delta(x_R)$ is 2.874.

The unilateral width w in the chord direction in the raised structure 2 is not particularly limited if the unilateral width w is sufficiently longer than the maximum height h of the raised structure 2. For example, w may be equal to or more than 10 times h, and more preferably to be equal to or more than 30 times h.

For example, in the example shown in the figure (b) of FIG. 8, since w=4 (mm), w is 16 times h.

Although specific example of the raised structure 2 has been described, the shape of the raised structure 2 is not limited thereto.

For example, the uneven shape in the chord direction in the raised structure 2 may be represented by a periodic function other than the sine function if the dominant wavenumber is $\beta_R$. However, it is more preferable that the periodic function has a smooth change in the gradient in the chord direction.

Furthermore, the uneven shape in the chord direction in the raised structure 2 may be a shape that is not represented by a specific periodic function if the shape is a periodic uneven shape having a dominant wavenumber $\beta_R$.

For example, the envelope of the uneven shape in the spanwise in the raised structure 2 is not limited to the Gaussian function only if the height of the uneven shape changes smoothly such that it is difficult for the disturbance by the wavenumber other than $\beta_R$ to be excited. For example, if the convex shape is a shape that is difficult to disturb the flow such as a streamline shape, a bell shape or the like, the specific function shape is not particularly limited, and the convex shape may be a shape that is not represented by a function.

The method for forming the raised structure 2 on the wing 1 is not particularly limited only if the necessary uneven shape as the raised structure 2 can be formed.

For example, the raised structure 2 may be formed on the upper surface 1a during the molding of the upper surface 1a.

For example, the raised structure 2 may be manufactured as a sheet member in which the necessary uneven shape is formed on the surface thereof. The sheet member may be attached to the wing 1 by adhesion or the like on the upper surface 1a. The method of forming the raised structure 2 in the sheet member includes molding, press molding, removal machining, and the like.

For example, the raised structure 2 may be formed on the upper surface 1a by curing the raw material applied on the upper surface 1a to the necessary uneven shape. As the method for curing the raw material, for example, ultraviolet irradiation, heating, and the like may be used. As a method of forming the uneven shape, a molding die may be used, and an unnecessary portion may be removed after the layered portion is formed. For example, the removal machining includes mechanical removal, chemical removal, laser processing, and the like.

For example, the raised structure 2 may be formed by adding or depositing a raw material onto the sheet member that is attached to the upper surface 1a or the upper surface 1a. Examples of addition and deposition methods include 3D printing, inkjet printing, and the like; however, the addition and deposition methods are not particularly limited thereto.

The material of the raised structure 2 is not particularly limited only if it is a material having durability under the usage condition of the wing 1. For example, one or more materials selected from the group consisting of metal material, non-metallic inorganic material, and organic materials may be used as the material of the raised structure 2.

Next, the effect of the raised structure 2 will be described.

Each unit ridge 2a configuring the raised structure 2 extends along the direction of the flow line (S in FIG. 1) at the outer edge of the boundary layer. The end portions in the longitudinal direction and the short direction of each unit ridge 2a are smooth curved surfaces whose height gradually increases from the upper surface 1a. Furthermore, the intermediate portion 2m of each unit ridge 2a is a smooth convex curved surface whose height gradually increases to the apex in the longitudinal direction and the short direction.

In order to form such a shape, the unit ridge 2a is formed in the streamline shape which is difficult to inhibit the flow in the main flow (MF) direction as shown in FIG. 2, and the unit ridge 2a is formed as the bulge so as to allow the main flow to pass smoothly.

Even if the raised structure 2 is viewed as a whole, the unit ridges 2a are periodically arranged in the spanwise such that it is difficult for the flow passing in the main flow direction to be inhibited.

The raised structure 2 extends long in the spanwise as a whole in a dome shaped range by moving the envelope parallelly to the spanwise, and the cross-sectional shape in the spanwise is formed from the periodic uneven shape of the wavenumber $\beta_R$. Accordingly, the disturbance of the wavenumber $\beta_R$ is excited by the crossflow (CF) having the directional component orthogonal to the main flow (MF) direction passing through the periodic uneven shape of the wavenumber $\beta_R$.

In this manner, the raised structure 2 forms a roughness element configured to selectively excite the disturbance of the wavenumber $\beta_R$ in the exclusive crossflow component inside the boundary layer at a location having a distance $x_R$ from the stagnation point St.

Next, the effect of the disturbance of the wavenumber $\beta_R$ suppressing the turbulence transition will be described on the basis of the numerical analysis result.

Figure 9:
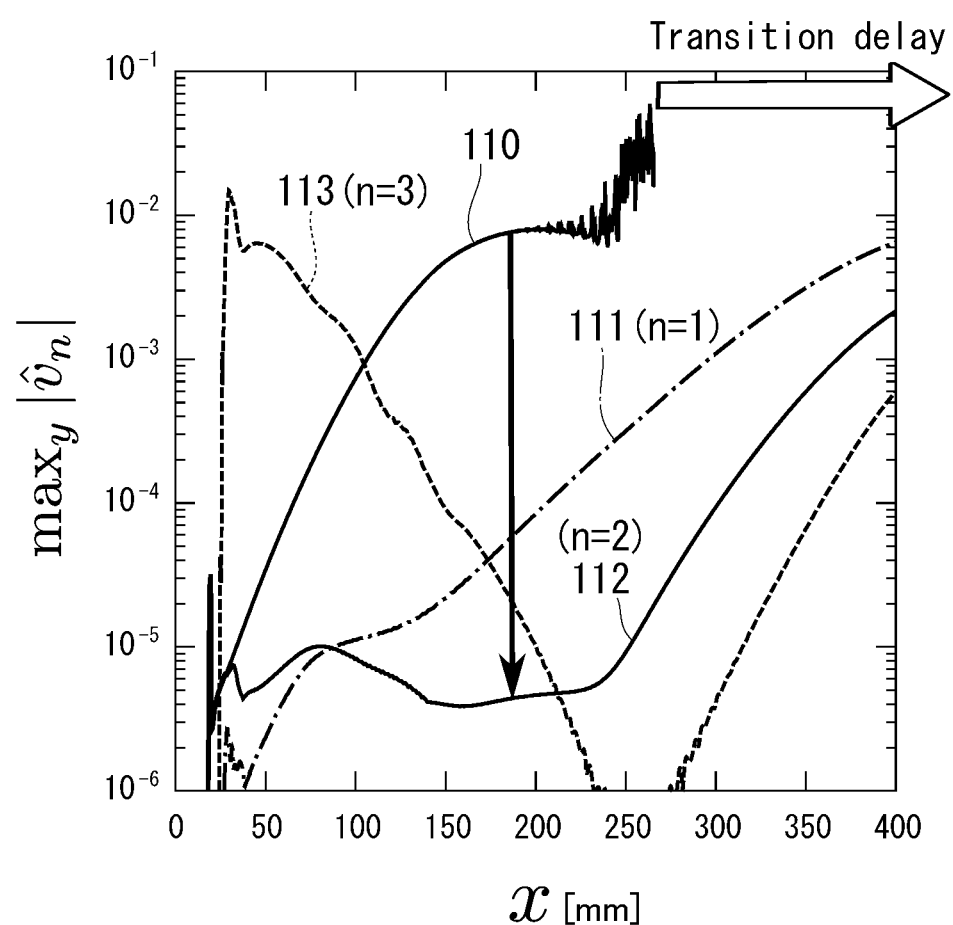
FIG. 9 is a graph showing the effect of a raised structure according to the embodiment of the present invention.

FIG. 9 is a graph showing the effect of the raised structure according to the embodiment of the present invention. In FIG. 9, the horizontal axis represents the location x in the chord direction, the vertical axis represents $\max_y |v_n|$ (however, the hat symbol (circumflex accent on v) is omitted, for example) corresponding to the amplitude of the disturbance. In FIG. 9, the vertical axis is a semilog graph having a logarithmic scale.

The graph shown in FIG. 9 shows the result of exciting the mode of the disturbance wavenumber by disposing the disturbance source at the location of x=20 (mm) by blowing out or suctioning with an appropriate initial amplitude. The vertical axis $\max_y |v_n|$ represents the numerical value obtained by performing the discrete Fourier transform with respect to the wall-normal direction velocity v to acquire the maximum value of the amplitude in the wall-normal direction (y-direction). Hereinafter, $\max_y |v_n|$ is referred to as the amplitude of the disturbance.

The spanwise wavenumber $\beta$ is represented such as $\beta = 1.666n$ (mm$^{-1}$) (wherein n=1, 2 . . . ) that is labeled with an integer n. In order to make the graph easy to view, in FIG. 9, only the result when n=1, 2 and 3 are shown therein.

The shape of the raised structure 2 used in the calculation is represented by the equation (1) shown above, wherein $\beta_R=5.000$ (mm$^{-1}$) (n=3), $W_e(x_R)/U_e(x_R)=0.57$, h=0.25 (mm), w=4 (mm), and $x_R=30$ (mm).

Here, the parameter $\beta_R=5.000$ (mm$^{-1}$) is set so as to suppress the disturbance of $\beta=3.333$ (mm$^{-1}$) with a large N-factor. In this example, the spanwise wavenumber $\beta_R$ is 1.5 times the wavenumber $\beta=3.333$ (mm$^{-1}$) of the mode of the suppression target disturbance (referred to as the target mode).

In order to suppress the target mode, a disturbance mode in which the wavenumber artificially excited by the raised structure 2 is dominant is referred to as a killer mode.

In FIG. 9, the curve 110 represents the amplitude of the disturbance on the top surface 1a where the raised structure 2 is not provided.

In a case in which there is no raised structure 2 provided, as shown in the curve 110, the amplitude of the disturbance is exponentially increased from x=20 (mm) due to the crossflow instability and saturated near x=180 (mm). As x further increases, it is noted that the secondary instability occurs from the vicinity of x=200 (mm) and it almost transitions to the turbulent flow near x=250 (mm). However, as a trigger for the secondary instability, a minute vibration disturbance is numerically given at the location of x=180 (mm).

In FIG. 9, the curves 111, 112, and 113 represent changes in the Fourier component of the amplitude of the disturbance corresponding to the spanwise wavenumber $\beta$ of n=1, 2, and 3, respectively.

As shown in the curve 113, when n=3, the amplitude sharply increases to reach the maximum value in the formation region of the raised structure 2 arranged with the location x=30 (mm) as the center, and then the amplitude decreases as x increases. In particular, in the vicinity of x=250 (mm), the amplitude is substantially zero. The amplitude increases as x further increases; however, turbulence transition does not occur even at x=400 (mm).

Although the maximum value of the curve 113 exceeds the amplitude at the time of the turbulence transition in the curve 110, the turbulence transition does not occur. It is considered that the turbulence transition in the curve 110 is formed by the growth of the disturbance having a wavenumber lower than $\beta=5.000$ (mm$^{-1}$).

In a case of the target mode (n=2) as shown in the curve 112, the amplitude of the disturbance is suppressed to substantially zero until in the vicinity of x=240 (mm). When x further increases, the amplitude increases exponentially; however, no turbulence transition occurs even at x=400 (mm).

In a case of a wavenumber (n=1) as shown in the curve 111 that is lower than the target mode, it increases exponentially as x increases. Although the amplitude suppression effect is less than that in the target mode, the turbulence transition does not occur even at x=400 (mm).

Although it is not shown in FIG. 9, in the case of the mode wherein n is equal to or more than 4, the disturbance is excited in the mode wherein n is a multiple of 3 as same as the case of n=3, and the amplitude is suppressed in other modes. In either mode, the amplitude is reduced more than the amplitude corresponding to the lower wavenumber. Accordingly, as shown in FIG. 9, the effect of the raised structure 2 can be sufficiently predicted only by evaluating the amplitude growth in the killer mode, the target mode, and the mode having a lower wavenumber than the target mode.

Figure 10:
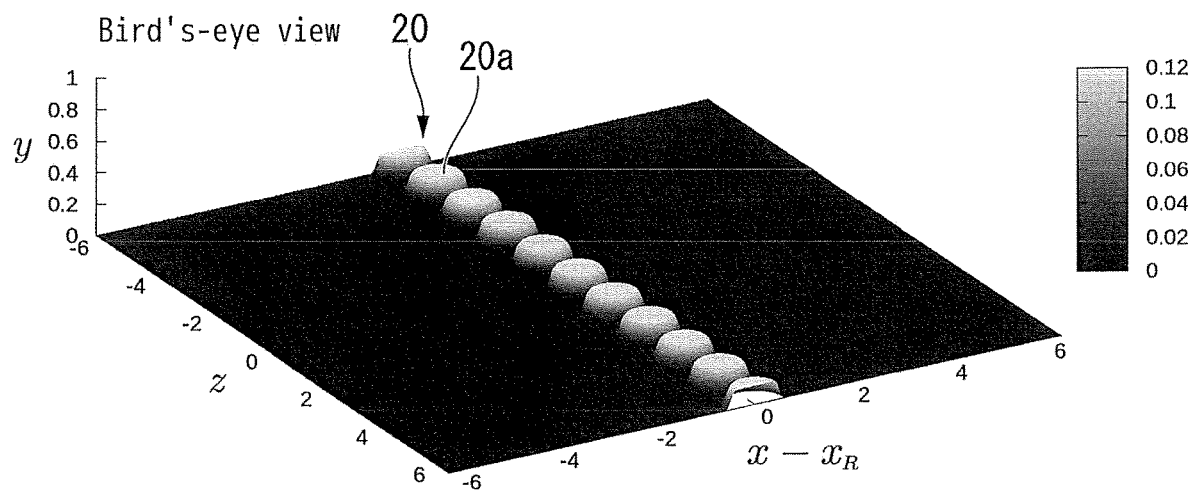
FIG. 10 is a perspective view showing a raised structure of a comparative example.
Figure 11:
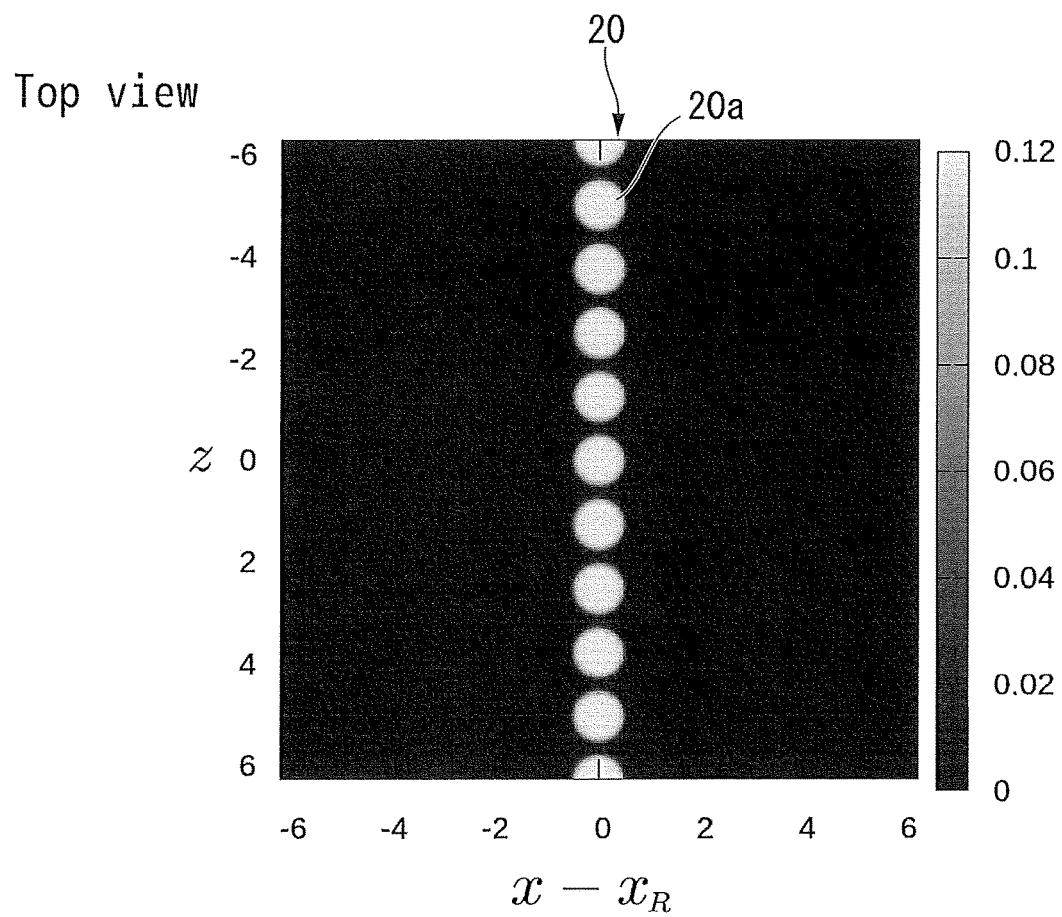
FIG. 11 is a plan view showing a raised structure of the comparative example.
Figure 12:
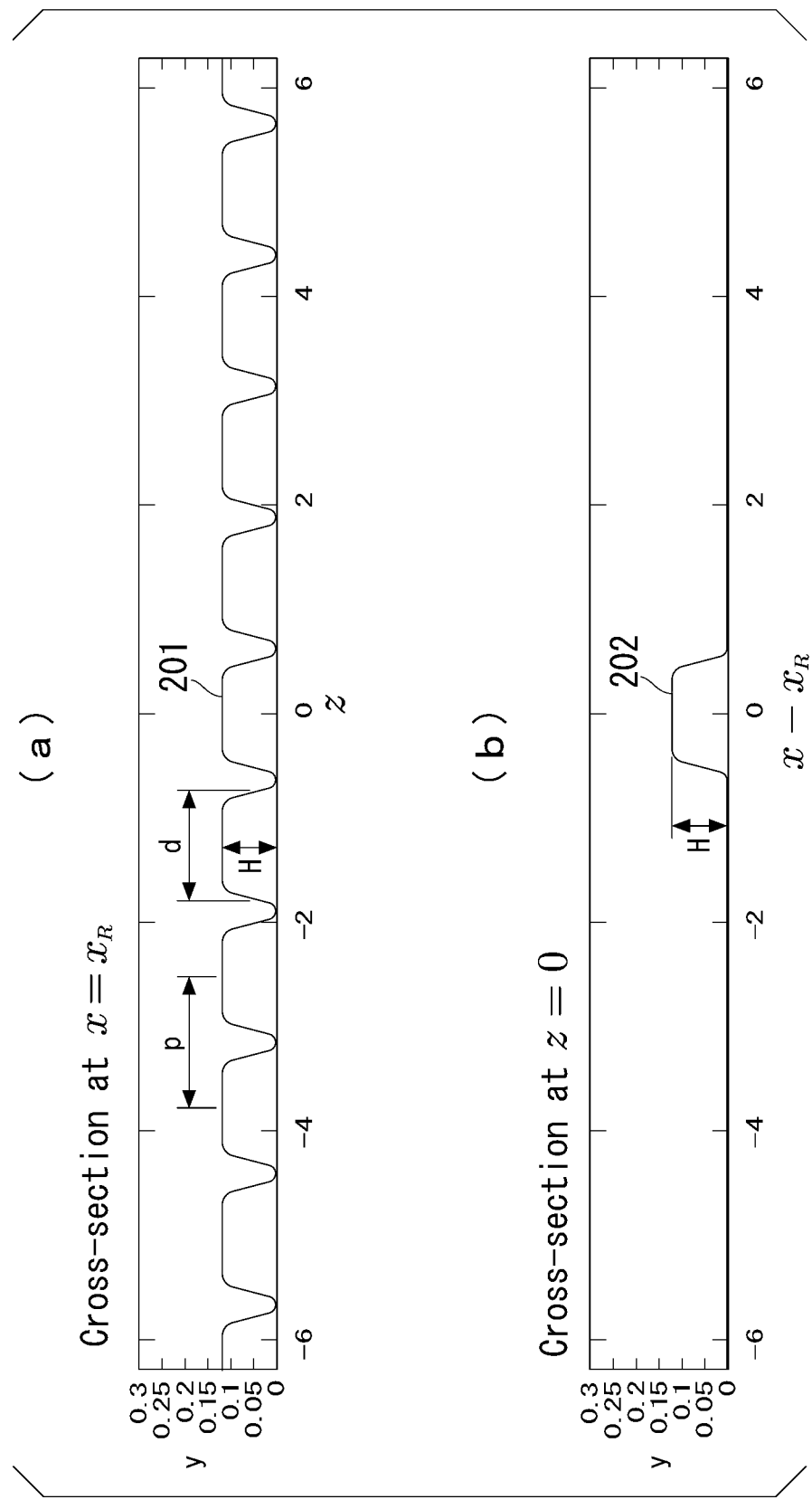
FIG. 12 is a graph showing a cross-sectional shape in the spanwise and chord direction of the raised structure of the comparative example.

Next, the effect of the raised structure 2 according to the present embodiment will be described in comparison with a comparative example. FIG. 10 is a perspective view showing a raised structure according to a comparative example. FIG. 11 is a plan view showing the raised structure according to the comparative example. In FIG. 12, the figures (a) and (b) are graphs showing cross-sectional shapes of the raised structure according to the comparative example in the spanwise and the chord direction, respectively.

In FIGS. 10 to 12, x, y, and z are dimensionless by 1 mm.

As shown in FIGS. 10 and 11, the raised structure 20 according to the comparative example includes a unit ridge 20a formed in a substantially columnar shape instead of the unit ridge 2a in the raised structure 2 according to the present embodiment. Hereinafter, the differences from the above-described raised structure 2 will be mainly described.

The raised structure 20 has a structure substantially the same with the discrete roughness element disclosed in Non-Patent Document 1. However, the specific dimensions are appropriately changed so as to be suitably compared with the raised structure 2.

The target mode by the raised structure 20 is $\beta=3.333$ (mm$^{-1}$) as same as in the embodiment.

As shown in the curve 201 in the figure (a) of FIG. 12, the unit ridge 20a is formed in a substantially cylindrical shape having an average diameter d of 1 mm and a height H of 0.12 mm. However, the side surface of the unit ridge 20a has a tapered inclination in a protruding direction, and the outer edge of the tip portion is rounded.

As shown in the figure (b) of FIG. 12, the unit ridges 20a are arranged in a row at equal pitches in the spanwise at $x=x_R$. The array pitch p of the unit ridge 20a in the spanwise (see figure (a) of FIG. 12) is $2\pi/5.000$ mm so as to excite the disturbance of $\beta=5.000$ (mm$^{-1}$).

Figure 13:
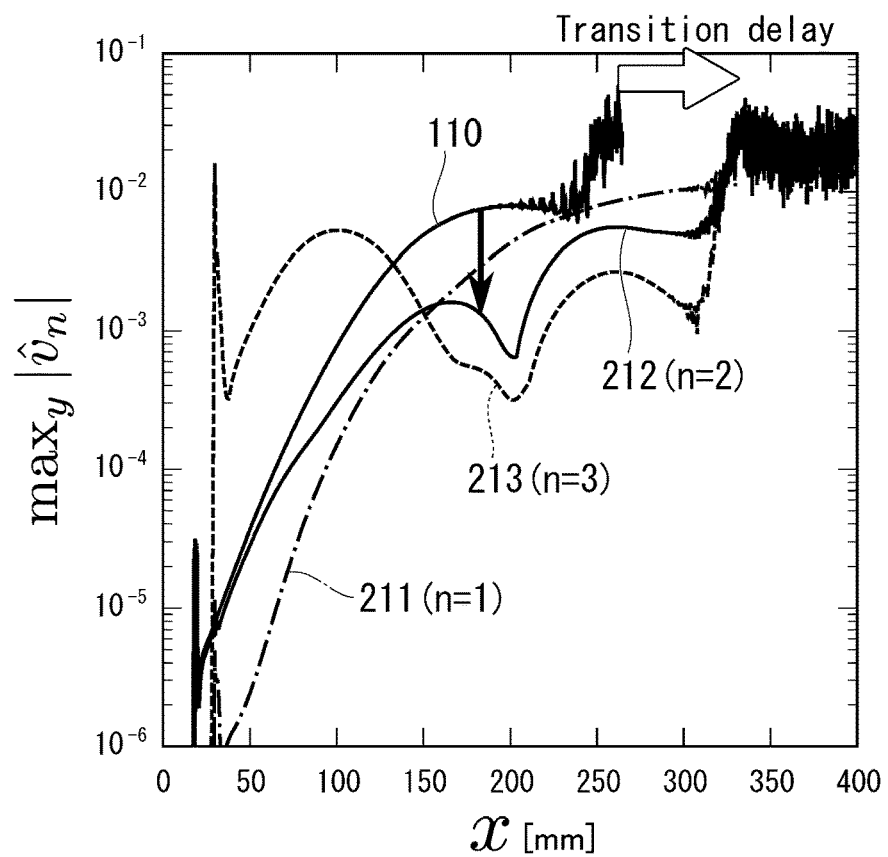
FIG. 13 is a graph showing the action of the raised structure of the comparative example.

Similar to the embodiment, the result of numerically calculating the amplitude of the disturbance in the wing having the raised structure 20 is shown in FIG. 13.

FIG. 13 is a graph showing the effect of the raised structure according to the comparative example. The vertical and horizontal axes in FIG. 13 are the same as the vertical and horizontal axes in FIG. 9.

In FIG. 13, a curve 110 similar to that in FIG. 9 is plotted for comparison.

Curves 211, 212, and 213 represent changes in the Fourier component of the amplitude of the disturbance corresponding to the spanwise wavenumber $\beta$ of n=1, 2, and 3, respectively.

As shown in the curve 213, in the case of the killer mode wherein n=3, the amplitude sharply increased to the maximum value to reach the maximum value in the formation region of the raised structure 20 arranged around x=30 (mm) as the center, and then the amplitude turns to increase after once decreasing sharply. In the case of the killer mode wherein n=3, the amplitude was shown to have a bimodal change with the maximum value near x=100 (mm), the minimum value near x=200 (mm), and the maximum value near x=260 (mm). Thereafter, the amplitude became unstable near x=300 (mm) and then increased sharply. It is noted that the transition to the turbulent flow occurred in the vicinity of x=330 (mm).

In the case of the target mode (n=2) as shown in the curve 212, the amplitude of the disturbance increased exponentially until in the vicinity of x=160 (mm) to reach the maximum value, and then reached the minimum value near x=200 (mm). As x increased further, the amplitude increased exponentially and saturated near x=250 (mm). Thereafter, similar to the killer mode, the amplitude became unstable near x=300 (mm) and then increased sharply. It is noted that the transition to the turbulent flow occurred in the vicinity of x=330 (mm).

In the case of a wavenumber lower than the target mode (n=1) as shown in the curve 211, similar to the target mode, the amplitude increased exponentially as x increased. However, as shown in the curve 211, it is noted that the amplitude increases even when it exceeds x=160 (mm), and the amplitude saturates in the vicinity of x=300 (mm) and then transitions to the turbulent flow.

According to the comparative example, the turbulence transition occurred in the vicinity of x=330 (mm) in all modes of n=1, 2, and 3. Accordingly, the effect of the raised structure 20 is that the turbulence transition location can be shifted downstream by 80 mm from x=250 (mm) to x=330 (mm).

On the other hand, according to the calculation result corresponding to the raised structure 2 according to the present embodiment, the turbulence transition did not occur at least up to x=400 (mm) in the calculation range, and there was no sign that the turbulence transition would occur. Accordingly, according to the raised structure 2, the turbulence transition location can be shifted downstream by equal to or more than 150 mm.

Next, the examination results of the maximum height h of the raised structure 2 will be described.

Figure 14:
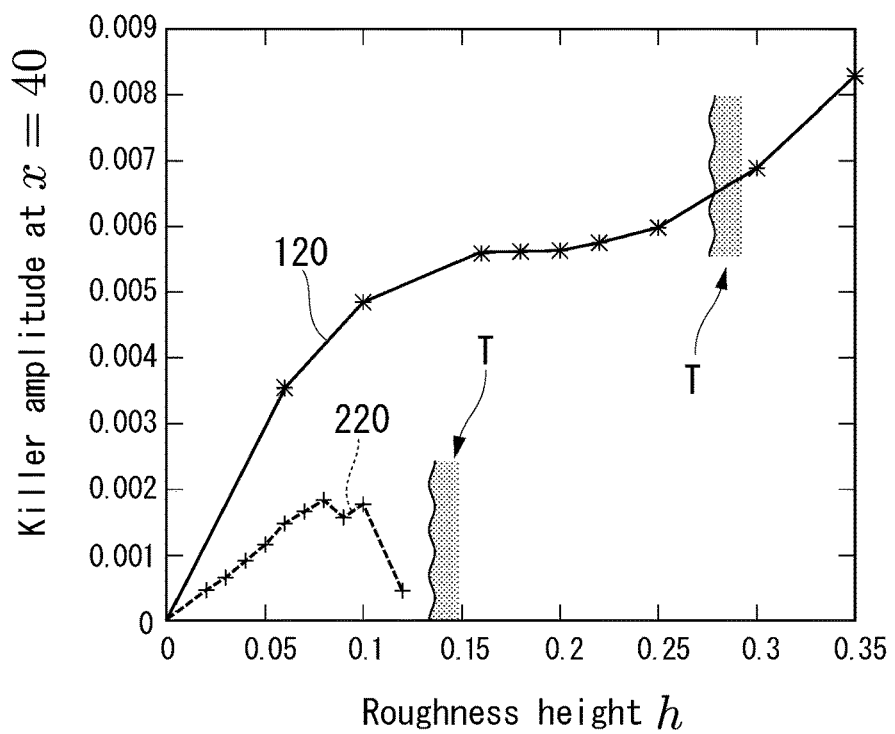
FIG. 14 is a graph showing the relationship between the height of the raised structure and a killer amplitude.

FIG. 14 is a graph showing the relationship between the height of the raised structure and the killer amplitude.

With respect to the raised structures 2 and 20, the maximum height h was changed and the same calculation as described above was performed to obtain the relationship between the maximum height h and the amplitude of the disturbance (killer amplitude) in the killer mode and the result was shown in FIG. 14.

In FIG. 14, the horizontal axis is the maximum height h of the raised structure, and the vertical axis is the amplitude of the disturbance in the killer mode at x=40 (mm). In the present analysis, the boundary layer displacement thickness δ at $x_R$=30 (mm) was 0.087 mm.

The polygonal lines 120 and 220 show the results of the raised structures 2 and 20, respectively.

As shown in the polygonal line 120, in the raised structure 2, the killer amplitude increased as the maximum height h increased, and the killer amplitude became substantially constant in the vicinity of h=0.16 (mm). However, the killer amplitude further increased from the vicinity of h=0.25 (mm). However, when h was equal to or more than 0.30 (mm), the turbulent region T was immediately entered from $x_R$=30 (mm) to the downstream side.

As shown in the polygonal line 220, in the raised structure 20, the killer amplitude increased monotonically with the increase of the maximum height h until h=0.07 (mm). However, the change rate was much less than that of the raised structure 2. Furthermore, the killer amplitude was substantially saturated at h=0.07 (mm) and sharply decreased when exceeding h=0.10 (mm).

In the case of providing the raised structure 20, when h exceeded 0.10 (mm), the killer mode was almost not excited. Furthermore, when h=0.15 (mm) or h is more than 0.15 (mm), the turbulent region T was immediately entered from $x_R$=30 (mm) to the downstream side.

In the case of the raised structure 2 according to the present embodiment, the killer amplitude can be controlled according to the magnitude of h in the range of the maximum height h from equal to or more than zero mm to less than 0.16 mm. Further, in the range where h is equal to or more than 0.16 mm and equal to or less than 0.25, the killer amplitude can be kept constant and the turbulence transition can be suppressed.

It is considerable that the reason why the turbulence transition cannot be suppressed when h exceeds 0.25 mm is that h exceeds 3 times the boundary layer displacement thickness δ such that the convex portion of the raised structure 2 extends to the high-speed flow region outside the boundary layer and the turbulence transition is immediately caused due to the flow separation by the convex portion in the high-speed flow region. When the flow separation occurs, the turbulence transition is promoted on the contrary such that it is preferable that h is equal to or more than 1.7 times and equal to or less than 2.3 times δ as a safety estimate.

In the case of the raised structure 20 according to the comparative example, the excitation ability of the killer amplitude was lower than that of the raised structure 2, and the effect of suppressing the turbulence transition was also lower. For example, when h exceeds 0.10 mm, there is no excitation ability available. It is considerable that since the substantially cylindrical shape is far different from the streamline shape, the turbulence transition due to the flow separation is caused even if h/δ is less than 2.

As described above, according to the raised structure 2 and the wing 1, the turbulence transition location can be shifted to the downstream side in the boundary layer where the cross flow occurs. As a result, the turbulent boundary layer in which the frictional drag becomes significantly larger can be reduced and the region of the laminar flow boundary layer in which the frictional drag is smaller can be expanded as compared to the case where the raised structure 2 is not provided.

According to the raised structure 2 and the wing 1, the frictional drag caused by the crossflow instability can be reduced.

According to the above-described embodiment, the case where the raised structure is provided on the sweepback wing of the aircraft has been described. However, the object provided with the raised structure is not limited to the sweepback wing of the aircraft as long as the cross-flow instability is possible to occur in the object.

Examples of objects to which the raised structure can be provided include wings used for apparatus other than the aircraft, retreating cylinders in the flow, and conical rotating bodies whose diameter increases from the upstream side to the downstream side in the flow direction.

Furthermore, the type of viscous fluid is not limited as long as the fluid in which the object provided with the raised structure is disposed is the viscous fluid. The viscous fluid may be a compressible fluid or an incompressible fluid.

Although the preferred embodiment of the present invention has been described above, the present invention is not limited to this embodiment. Configurations can be added, omitted, replaced, and other modifications without departing from the spirit of the present invention. Further, the present invention is not limited by the above description, and is limited only by the appended claims.

INDUSTRIAL APPLICABILITY

According to the above embodiment, it is possible to provide a raised structure and a wing capable of reducing frictional drag due to cross-flow instability.

REFERENCE SIGNS LIST

1 Wing (object)
1a Upper surface (surface)

1b Lower surface
2 Raised structure
2a Unit ridge (raised body)
f Leading edge
F Flow
St Stagnation point

What is claimed is:

1. A raised structure configured to reduce frictional drag due to viscosity of a flow flowing along an object in a direction defining an acute angle with a leading edge of the object, the raised structure comprising:
a plurality of raised bodies configured to: (i) be provided on a surface of the object at the leading edge of the object on a downstream side of a stagnation point of the flow; and (ii) extend in a direction along the flow on the surface of the object,
wherein:
the plurality of raised bodies is arranged in an array to define an uneven shape changing periodically in a cross section configured to have a constant distance from the stagnation point of the flow and be orthogonal to the surface of the object;
each of the plurality of raised bodies includes a tip end, a rear end, and an intermediate portion;
for each of the plurality of raised bodies:
the tip end, the rear end, and the intermediate portion define a convex portion configured to be raised from the surface of the object;
the tip end is configured to be located at an upstream side in the direction along the flow on the surface of the object;
the tip end is configured to define a first boundary between the convex portion and the surface of the object;
the rear end is configured to be located at a downstream side between the leading edge of the object and a maximum thickness of the object in the direction along the flow on the surface of the object, the maximum thickness of the object being between the leading edge of the object and a trailing edge of the object located at a side opposite to the leading edge of the object;
the rear end is configured to define a second boundary between the convex portion and the surface of the object;
the intermediate portion is located between the tip end and the rear end when viewed from a rising direction of the convex portion;
the intermediate portion is located at an apex of the convex portion at which a height of the intermediate portion reaches a maximum value in the rising direction; and
the plurality of raised bodies defines a roughness element configured to excite disturbance in a crossflow component in a direction intersecting the direction along the flow inside a boundary layer generated on the surface of the object.

2. The raised structure according to claim 1, wherein, for each of the plurality of raised bodies:
a first curve is defined on the convex portion such that a height of the first curve from the surface of the object increases from the tip end toward the intermediate portion; and
a second curve is defined on the convex portion such that a height of the second curve from the surface of the object increases from the rear end toward the intermediate portion.

3. The raised structure according to claim 1, wherein a maximum height of each of the plurality of raised bodies is equal to or more than 1.7 times and equal to or less than 2.3 times a boundary layer displacement height defined by the flow.

4. The raised structure according to claim 1, wherein:
the uneven shape is a first uneven shape;
the cross section is a first cross section;
the array defines a second uneven shape changing in a second cross section configured to be orthogonal to a line composed of the stagnation point of the flow and the first cross section;
the second uneven shape has concave portions and convex portions that change periodically; and
a height of an apex of each of the convex portions of the second uneven shape changes along a convex envelope.

5. The raised structure according to claim 4, wherein:
the first uneven shape is a sinusoidal shape having a constant wavenumber; and
the convex envelope is a bell-shaped curve.

6. An object configured to be provided in fluid, the object comprising:
the raised structure according to claim 1,
wherein:
the raised structure is on the surface of the object; and
the rear end of each of the plurality of raised bodies is located at the downstream side between the leading edge of the object and the maximum thickness of the object in the direction along the flow on the surface of the object.

7. The object according to claim 6, wherein the raised structure is at or adjacent to the leading edge of the object.

8. A raised structure configured to suppress transition of a flow from a laminar flow to turbulence and thereby reduce frictional drag due to viscosity of the flow, the flow flowing along an object in a direction defining an acute angle with a leading edge of the object, the raised structure comprising:
a plurality of raised bodies configured to: (i) be provided on a surface of the object at the leading edge of the object on a downstream side of a stagnation point of the flow; and (ii) extend in a direction along the flow on the surface of the object,
wherein:
the plurality of raised bodies is arranged in an array to define an uneven shape changing periodically in a cross section configured to have a constant distance from the stagnation point of the flow and be orthogonal to the surface of the object;
each of the plurality of raised bodies includes a tip end, a rear end, and an intermediate portion;
for each of the plurality of raised bodies:
the tip end, the rear end, and the intermediate portion define a convex portion configured to be raised from the surface of the object;
the tip end is configured to be located at an upstream side in the direction along the flow on the surface of the object;
the tip end is configured to define a first boundary between the convex portion and the surface of the object;
the rear end is configured to be located at a downstream side between the leading edge of the object and a maximum thickness of the object in the direction along the flow on the surface of the object, the maximum thickness of the object being between the leading edge of the object and a trailing edge of the object located at a side opposite to the leading edge of the object;
the rear end is configured to define a second boundary between the convex portion and the surface of the object;

the intermediate portion is located between the tip end and the rear end when viewed from a rising direction of the convex portion;

the intermediate portion is located at an apex of the convex portion at which a height of the intermediate portion reaches a maximum value in the rising direction; and the plurality of raised bodies defines a roughness element configured to excite disturbance in a crossflow component in a direction intersecting the direction along the flow inside a boundary layer generated on the surface of the object.

* * * * *